United States Patent Office 3,127,272
Patented Mar. 31, 1964

3,127,272
METHOD FOR MAKING PEANUT SPREAD
Joseph S. Baker, Green Township, Edward E. Colby, Cincinnati, and Thomas W. Hurley, Colerain Township, Ohio, assignors to The Procter & Gamble Company, Cincinnati, Ohio, a corporation of Ohio
No Drawing. Filed May 24, 1961, Ser. No. 112,236
4 Claims. (Cl. 99—128)

This invention relates to packaged peanut products. More particularly, it relates to a method for making a peanut spread suitable for packaging in flexible containers similar to the types used for packaging butter and margarine.

In commercial practice peanut butters are packaged in rigid containers, usually glass jars. Removal of the contents of these jars is inconvenient, since a knife or other utensil must be inserted into the container and then removed with a quantity of the contents sticking to it. A large amount of waste can occur, especially when the jar is nearly empty due to the difficulty of removing the peanut butter from the sides and bottom of the container. In addition, most housewives do not desire to place a glass jar of peanut butter on a table for consumption during a meal.

A peanut spread, packaged in a flexible wrapper similar to that used for butter or margarine, would overcome many of the disadvantages inherent in products packed in glass containers. The spread could be unwrapped and placed on a plate, and thus could be available for convenient use during a meal.

The addition to peanut butter of hardened fats to prevent oil separation is known. It has also been suggested that the use of these hardened fats will give sufficient body to peanut butters to maintain their shape when packed in a flexible container. It has been found, however, that when conventional methods are used to make such peanut butters, the amount of hard fats needed to provide sufficient body will result in a waxy consistency. Also, it has been difficult to provide a peanut butter from which a flexible wrapping can be separated without the peanut butter sticking to the wrapping.

Accordingly, an object of this invention is to provide a method for making a peanut spread which is especially suitable for packaging in a flexible container and which will retain its shape.

An additional object is to provide a wrapped peanut spread which will not stick to the wrapping material.

Other objects and advantageous features will be apparent from the following detailed description.

In general, the method for making a peanut spread of this invention comprises forming a mixture of ground roasted peanuts and a stabilizer. The stabilizer comprises about 0.3% to 3.5%, by weight of spread, of substantially completely hydrogenated fatty glyceride. Additionally, the stabilizer can comprise up to about 20%, by weight of spread, of partially hydrogenated fatty glyceride having an SCI at 50° F. of from about 17 to 28 and an SCI at 92° F. of not more than about 6. The mixture is thoroughly mixed at a temperature sufficiently high to melt all fatty materials present, and is then rapidly cooled to a temperature of from about 35° F. to 85° F. It is then immediately packaged in a preformed container. The total elapsed time of cooling and packaging should not exceed about 1.25 minutes. The packaged spread is subsequently maintained without agitation until the fatty material is crystallized.

As expressed herein, all percentages of materials are by weight.

Any types of peanuts conventionally used in peanut butter are suitable for use in the process of this invention; the peanuts are roasted and crushed or ground into a paste by any suitable means.

The spread is stabilized by means of fatty glycerides which are substantially completely hydrogenated. This stabilizer material serves to prevent oil separation and to provide body for the spread. At least about 0.3% of these glycerides is required to provide the desired stability of the spread. However, if more than about 3.5% is used, the product will not melt in the mouth and will have a waxy consistency. The optimum amounts will also depend upon the temperature at which the spread is to be stored after it is packaged. In general, smaller amounts of the glycerides are required for products which are to be stored at lower temperatures. For a product which is to be kept under refrigeration conditions at a temperature of from about 35° F. to 70° F., the preferred content of substantially completely hydrogenated glycerides is from about 0.3% to 1.5%. For a product which is to be stored at room temperature, a preferred amount is from about 1.5% to 3.5%.

The peanut spread may also have present, as stabilizer materials, the solid fats contained in partially hydrogenated fatty glyceride oils. The amount of hydrogenation of the glyceride oils should be sufficient to provide an SCI value of from about 17 to 28 at 50° F. and an SCI value of not more than about 6 at 92° F. These SCI values can be determined by the dilatometric procedure outlined by Fulton et al. in J.A.O.C.S. vol. 31, p. 98, 1954. However, if more than about 20% of this partially hydrogenated material is present, the spread will be lacking in peanut flavor.

The stabilizer glycerides can include nearly any edible glyceride fat solid. Hydrogenated natural fats such as peanut oil, olive oil, corn oil, cottonseed oil, sunflower seed oil, linseed oil, palm oil, rapeseed oil, whale oil, and other marine oils alone or in combination, are very suitable to provide stabilizers. Also, synthetically-produced glycerides such as tripalmitin and tristearin are suitable.

Other ingredients can also be present in minor amounts in the peanut spreads of this invention. For example, pulverized salt may be desirable as a flavoring agent, and in a preferred product from about 0.8% to 1.5% salt is present. Finely ground sugar or other sweetening agent can be added, preferably in an amount ranging from about 2.0% to 3.0%. The addition of lecithin also may be desirable to aid in the prevention of sticking to the mouth, and from 0% to about 1.0% can be used.

In the preferred method of preparation of the packaged spreads of this invention, the stabilizer glyceride and lecithin, if used, are heated to a temperature high enough to melt all solid fatty material present. This stabilizer mixture is then added to a peanut paste, which has been made by grinding roasted peanuts. A part or all of the stabilizer can be added prior to or during the grinding of the peanuts. Any other ingredients used in the spread are then added, and the mixture is agitated to form a homogeneous mixture at a temperature at which all fatty materials are melted.

The mixture is then very quickly cooled. Preferably this is done by means of a heat exchanger such as a scraped wall freezer. The apparatus known as a "Votator" freezer and described in Vogt, U.S. Patents No. Re. 21,406, issued March 19, 1940, and No. 1,783,864, issued September 15, 1946, is very satisfactory for this purpose. After the cooling step, the product is immediately placed in a preformed container, and held without agitation, until the fatty material in the spread has crystallized. As used herein the term "agitation" includes any significant deformation or flow of product.

For spreads which are to be kept under refrigeration conditions the product should be cooled to a temperature of from about 35° to 70° F. For a product to be stored at room temperature the cooling may be to a temperature from about 35° to 85° F.

In order to prevent sticking of the spread to the wrap it is essential that a minimum amount of crystallization of fatty material occur prior to the time that the spread is placed in the container. Accordingly, the combined cooling and packaging steps should require no longer than about 1.25 minutes elapsed time. It has been found that crystallization prior to packaging will result in the formation of a thin film of the product on the surface of the packaging material.

Materials which can be used for packaging are those which are not toxic and which would impart no undesirable properties to a peanut spread for which they would be used. Suitable materials include parchment, metal foil, paper, plastic films such as polyethylene, glass, tin, and any combinations of these, although other materials can be used. Additionally, it is desirable to support preformed flexible wrappers in a mold during the filling and prior to crystallization of the fatty material.

Specific examples of the invention are as follows:

EXAMPLE I

The following mixture was used to make a peanut spread:

|  | Percent |
| --- | --- |
| Peanuts | 77.0 |
| Salt | 1.3 |
| Finely ground dextrose | 3.7 |
| A partially hydrogenated mixture comprising a major amount of soybean oil and a minor amount of cottonseed oil having an SCI value at 50° F. of 19.47 and an SCI value at 92° F. of 4.65 | 15.0 |
| Cottonseed oil hydrogenated to an I.V. of 8 | 3.0 |

The peanuts were roasted and ground to form a paste. The paste, which had a temperature of about 160° F. was transferred to a heated tank which was equipped with an agitator and maintained at a temperature of about 150° F. The fatty materials and lecithin were melted and added to the peanut paste. Then the salt and sugar were added, and the mixture was mixed for about 30 minutes to insure uniform distribution of the ingredients.

The mixture was pumped through a "Votator" scraped wall heat exchanger. The inlet temperature was about 140° F. and the outlet temperature was in the range of 68° to 70° F. The product was immediately filled into a laminated wrapper consisting of a layer of aluminum foil between a layer of paper and a polyethylene film. The total combined cooling and packing time was about 0.95 minutes. The wrapper had been formed to enclose a rectangular product measuring 4¾ x 1¼ x 1¼ inches. During filling the wrapper was open at the top and supported on the bottom and sides in a wooden mold. After filling, the wrapper was held without movement for about 30 seconds until the product had firmed. The wrapping was completed and the package was removed from the mold and stored at 80° F. for 2 days. The product was additionally stored for 1 day at 90° F. and then unwrapped. The small amount of the product sticking to the wrapper was measured for several samples, A, B, C and D, and compared with the original amount of wrapped product. From these figures a "percent residual product" was calculated.

By way of comparison, another product was made by the same procedure except that the combined cooling and packing time was 1.3 minutes. These are samples E, F, G and H. A comparison of the percent residual product is shown in Table I.

Table I

| Sample | Combined cooling and packing time (min.) | Percent residual product |
| --- | --- | --- |
| A | 0.95 | 1.1 |
| B | 0.95 | 0.9 |
| C | 0.95 | 0.8 |
| D | 0.95 | 1.2 |
| E | 1.30 | 2.9 |
| F | 1.30 | 3.8 |
| G | 1.30 | 3.8 |
| H | 1.30 | 4.0 |

As can be clearly seen, a much smaller amount of residual product remained on the wrapper for the product with the shorter combined cooling and packing time.

EXAMPLE II

A peanut spread was made under similar conditions to those of Example I, except that the cooled product was agitated for 2 minutes before packaging. After the products were stored at 80° F. for 2 days and then at 90° F. for 1 day they were unwrapped. A thin film of product covered the inner surface of the wrapping.

EXAMPLE III

The following composition was used to form a peanut product:

|  | Percent |
| --- | --- |
| Peanuts | 80.4 |
| Salt | 1.2 |
| Partially hydrogenated vegetable oil as in Example I | 15.0 |
| Cottonseed oil hydrogenated to an I.V. of 8 | 0.5 |
| Finely divided sucrose | 2.4 |
| Lecithin | 0.5 |

The ingredients were mixed as in Example I and then cooled from a temperature of about 142° F. to about 46° F. Two scraped-wall chillers in series were used. The combined cooling and packing time was 1.15 minutes. The product was held after filling for 1 minute and then stored for 2 days at 50° F. The consistency was found to be excellent for a refrigerated product, and the percent product residue upon unwrapping was 0.9%.

*Example IV*

A peanut product was prepared having the following composition:

|  | Percent |
| --- | --- |
| Peanuts | 77.0 |
| Salt | 1.3 |
| Finely ground dextrose | 3.7 |
| Cottonseed oil hydrogenated to an I.V. of 8 | 1.0 |
| Hydrogenated mixture containing about 85% soybean oil and 15% cottonseed oil having an SCI value at 50° of 26.15 and an SCI value at 92° of 3.79 | 17.0 |

The product was processed in a manner similar to that of Example I. The product was cooled from 138° F. to 52° F. in 0.94 minute. The consistency of this product was satisfactory and a very small amount of product stuck to the wrapper.

*Example V*

A peanut product was made having the following composition:

|  | Percent |
| --- | --- |
| Peanuts | 80.4 |
| Salt | 1.2 |
| Finely ground sucrose | 2.4 |
| Cottonseed oil hydrogenated to an I.V. of 8 | 1.0 |
| Partially hydrogenated vegetable oil of Example I | 15.0 |

The product was processed as described in Example I except that it was cooled from 138° F. to 50° F., and the combined cooling and packing time was 1.09 minutes.

After storage and subsequent unwrapping the percent residual product was found to be 2.27%. However, it was to be noted that practically all of this residual product was between folds in the wrapper.

Other substantially completely hydrogenated and partially hydrogenated oils including those derived from peanut oil, olive oil, corn oil, cottonseed oil, sunflower seed oil, linseed oil, palm oil, rapeseed oil, whale and other marine oils, and mixtures of these can be substituted in the foregoing examples with comparable results.

In summary, it can be seen that the process of this invention produces a product which has superior properties for combination with a flexible wrapping.

What is claimed is:

1. The method of making a packaged peanut spread suitable for storage without sticking to the packaging material which comprises the steps of forming a homogeneous mixture, at a temperature sufficiently high to melt all fatty materials present therein, said mixture comprising ground peanuts and a stabilizer, said stabilizer comprising, by weight of the spread, from about 0.3% to 3.5% of substantially completely hydrogenated fatty glyceride and from 0 to about 20% of a partially hydrogenated fatty glyceride having an SCI value at 50° F. of from about 17 to 28 and an SCI value at 92° F. of not more than about 6; rapidly cooling said mixture to a temperature of from about 35° F. to 85° F. and immediately packaging said mixture in a preformed flexible wrapping, the total elapsed time for said cooling and said packaging not exceeding about 1.25 minutes, wherein a minimum amount of crystallization of fatty material occurs prior to completion of packaging; and subsequently maintaining the packaged mixture, without agitation, until the fatty material therein is crystallized.

2. The method according to claim 1 wherein the homogeneous mixture contains additionally from about 0.8% to 1.5% salt, from about 2.0% to 3.0% sugar, and from 0% to about 1.0% lecithin.

3. The method of making a peanut spread, in a flexible wrapping, suitable for storage at refrigerator temperatures without sticking to said wrapping, which comprises the steps of forming a homogeneous mixture, at a temperature sufficiently high to melt all fatty materials present therein, said mixture comprising ground peanuts and a stabilizer, said stabilizer comprising, by weight of the spread, from about 0.3% to 1.5 of substantially completely hydrogenated fatty glyceride and from about 0% to 20% of a partially hydrogenated fatty glyceride having an SCI value at 50° F. of from about 17 to 28 and an SCI value at 92° F. of not more than about 6; rapidly cooling said mixture to a temperature of from about 35° F. to 70° F. and immediately packaging said mixture in a preformed flexible wrapping, the total elapsed time for said cooling and said packaging not exceeding about 1.25 minutes, wherein a minimum amount of crystallization of fatty material occurs prior to completion of packaging and subsequently maintaining the packaged mixture, without agitation, until the fatty material therein is crystallized.

4. The method of making a peanut spread, in a flexible wrapping, suitable for storage at normal room temperatures without sticking to said wrapping, which comprises the steps of forming a homogeneous mixture, at a temperature sufficiently high to melt all fatty materials present therein, said mixture comprising ground peanuts and a stabilizer, said stabilizer comprising, by weight of the spread, from about .5% to 3.5% of substantially completely hydrogenated fatty glyceride and from about 0 to 20% of a partially hydrogenated fatty glyceride having an SCI value at 50° F. of from about 17 to 28 and an SCI value at 92° F. of not greater than about 6; rapidly cooling said mixture to a temperature of from 35° F. to 85° F. and immediately packaging said mixture in a preformed flexible wrapping, the total elapsed time for said cooling and said packaging not exceeding about 1.25 minutes, wherein a minimum amount of crystallization of fatty material occurs prior to completion of packaging; and subsequently maintaining the packaged mixture, without agitation, at a temperature of from about 65° F. to 80° F. until the fatty material therein is crystallized.

References Cited in the file of this patent

UNITED STATES PATENTS

| | | |
|---|---|---|
| 1,445,174 | Rosenfield | Feb. 13, 1923 |
| 2,397,564 | Rosenfield et al. | Apr. 2, 1946 |
| 2,911,303 | Rowland et al. | Nov. 3, 1959 |